United States Patent [19]
Cluzel

[11] Patent Number: 5,738,740
[45] Date of Patent: Apr. 14, 1998

[54] TIRE HAVING SPECIFIED CROWN REINFORCEMENT

[75] Inventor: Guy Cluzel, Beaumont, France

[73] Assignee: Compagnie Generale des Etablissements Michelin - Michelin & Cie, Clermont-Ferrand Cedex, France

[21] Appl. No.: 849,619

[22] PCT Filed: Dec. 8, 1995

[86] PCT No.: PCT/EP95/04842

§ 371 Date: Jun. 5, 1997

§ 102(e) Date: Jun. 5, 1997

[87] PCT Pub. No.: WO96/20095

PCT Pub. Date: Jul. 4, 1996

[30] Foreign Application Priority Data

Dec. 23, 1994 [FR] France ................. 94 15736

[51] Int. Cl.⁶ ................. B60C 3/04; B60C 9/20; B60C 9/22; B60C 9/28

[52] U.S. Cl. ................. 152/527; 152/454; 152/526; 152/531; 152/534; 152/538

[58] Field of Search ................. 152/534, 531, 152/526, 527, 528–529, 454, 538

[56] References Cited

U.S. PATENT DOCUMENTS

| | | |
|---|---|---|
| 3,090,189 | 5/1963 | Boussu et al. |
| 3,095,026 | 6/1963 | Weber . |
| 3,667,527 | 6/1972 | Magistrini et al. ........ 152/531 X |
| 3,677,319 | 7/1972 | Mirtain . |
| 4,037,637 | 7/1977 | Arimura et al. |
| 4,271,890 | 6/1981 | Pommier . |
| 4,688,615 | 8/1987 | Lee . |

FOREIGN PATENT DOCUMENTS

| | | |
|---|---|---|
| 3327670 | 2/1985 | Germany . |
| 5069702 | 3/1993 | Japan . |

Primary Examiner—Adrienne C. Johnstone
Attorney, Agent, or Firm—Baker & Botts, L.L.P.

[57] ABSTRACT

In order to improve the endurance of the crown reinforcement (3) of a tyre, the H/S form ratio of which is at most 0.6, the latter is formed radially from the inside to the outside by a triangulation ply (31) of metal cables oriented at at least 60° and two working crown plies (32, 34) formed of inextensible metal cables oriented at angles of between 10° and 45°, between which there is inserted an additional ply (33) of metallic elements oriented substantially parallel to the circumferential direction of the tire.

4 Claims, 1 Drawing Sheet

5,738,740

TIRE HAVING SPECIFIED CROWN REINFORCEMENT

BACKGROUND OF THE INVENTION

The invention relates to a tire with radial carcass reinforcement anchored in each bead to at least one bead wire, and comprising a crown reinforcement formed by at least two so-called working plies, superposed and made of wires or cables which are parallel to each other in each ply and are crossed from one to the next, forming angles of at most 40° in absolute value with the circumferential direction of the tire.

More particularly, it relates to a "heavy load vehicle"-type tire, the ratio of the height above rim H to the maximum axial width S of which is at most 0.60, and which is intended to be fitted on a medium- or high-tonnage vehicle, such as a lorry, bus, trailer, etc.

It is very widely known to use in a tire crown reinforcements composed firstly of so-called working plies formed of cables forming a certain angle with the circumferential direction, and secondly of additional plies formed of cables oriented substantially circumferentially. Such an example of a structure is illustrated and described in U.S. Pat. No. 3,677,319, the working plies being formed of metallic elements oriented at angles of between 18° and 75°, whereas the additional plies are formed of textile cables oriented at 0°. Such a structure makes it possible to reconcile the contradictory qualities which are to be obtained by the tire: road-holding of the vehicle and comfort, wear resistance and rolling resistance, for example. The additional textile plies may be arranged either beneath or on top of or between the plies of metal cables, the width of the textile assembly being between 25 and 75% of the width of the metallic structure.

French Patent 2,419,185 teaches that the type of tire in question, with a low H/S ratio, although it has a number of advantages, also has a certain number of disadvantages, such as poor adhesion of the equatorial zone of the tread or localisation of high pressures in the region of the edges of the tread, due to the shortening of the area of contact in the longitudinal direction of the tire. In order to overcome these disadvantages, the cited French Patent recommends arranging between the carcass reinforcement and the radially inner working ply, in two zones distant from the equatorial plane, two limiting blocks each formed of two superposed plies of inextensible cables, crossed from one ply to the other, forming opposed angles with the circumferential direction which are at most equal in absolute value to half the smallest angle used in the working plies, and other than 0°.

Whatever the solution set forth above, the application thereof to a tire of H/S form ratio of at most 0.60 and intended to be fitted on a heavy load vehicle does not make it possible to obtain satisfactory endurance of the crown reinforcement. The lack of endurance relates both to the fatigue strength of the crown plies, and in particular the resistance to separation between ply ends, and to the fatigue strength of the cables of the portion of carcass reinforcement located beneath the crown reinforcement, the first inadequacy being greatly influenced by the operating temperature prevailing in the margins of the working plies, be it during travel in a straight line or drift travel.

SUMMARY OF THE INVENTION

The object of the invention is to improve the endurance of the crown reinforcement of a heavy-vehicle tire of the H/S ratio in question. In order to achieve this object, the tire according to the invention, having a crown reinforcement comprising at least two working crown plies of inextensible cables, crossed from one ply to the next, forming angles of between 10° and 45° with the circumferential direction, said plies having widths at least equal to 80% of the maximum axial width $S_0$ of the carcass reinforcement, is characterised in that firstly an axially continuous ply formed of inextensible metal cables forming with the circumferential direction an angle of at least 60° and the axial width of which is at least equal to the axial width of the shortest working crown ply is arranged between the carcass reinforcement and the working ply radially closest to the axis of rotation, and secondly an additional ply formed of metallic elements oriented substantially parallel to the circumferential direction, the axial width of said ply being at least equal to 0.7 $S_0$, and its elasticity modulus upon traction being at most equal to the modulus of the same name of the most extensible working ply, is arranged between the two working crown plies.

"Inextensible cable" is to be understood to mean a cable, for example of steel, which has a relative elongation of less than 0.2% to 10% of the breaking load.

Wires or cables oriented substantially parallel to the circumferential direction are wires or cables which form angles within the range +2.5°, −2.5° around 0° with said direction.

An elasticity modulus upon traction of a ply of cables results from the tensile stress, exerted in the direction of the cables, necessary to obtain a given relative elongation ϵ, said modulus being a tangent modulus. "Elasticity modulus of the additional ply which is at most equal to the modulus of the same name of the most extensible working ply" is to be understood to mean that the tangent modulus of the additional ply, whatever the relative elongation, is at most equal to the tangent modulus of the most extensible working ply whatever the relative elongation, the most extensible ply being the ply which, for each value of tensile stress, has a relative elongation greater than that of the other ply for the same stress.

Advantageously, and in order to facilitate the production of the tire, the modulus of the additional ply will be such that it is low for a relative elongation of between 0% and 0.4%, and at most equal to the greatest elasticity modulus upon traction of the most extensible working ply, for relative elongations greater than 0.4%.

Within the above framework, the additional ply can be formed of so-called elastic cables, having a curve of tensile stress as a function of the relative elongation which has shallow gradients for the slight elongations and a substantially constant and steep gradient for the greater elongations. The additional ply may also be formed of cables oriented circumferentially and cut so as to form sections of a length very much less than the circumference of the ply, but preferably greater than 0.1 times said circumference, the cuts between sections being axially offset relative to each other. Such an embodiment makes it possible to impart to the additional ply the desired modulus, whatever it may be, in simple manner.

DESCRIPTION OF THE DRAWINGS

The characteristics and advantages of the invention will be better understood with the aid of the following description which relates to the drawings, which illustrates examples of embodiment in non-limitative manner, and in which.

DESCRIPTION OF PREFERRED EMBODIMENTS

Figure 1:
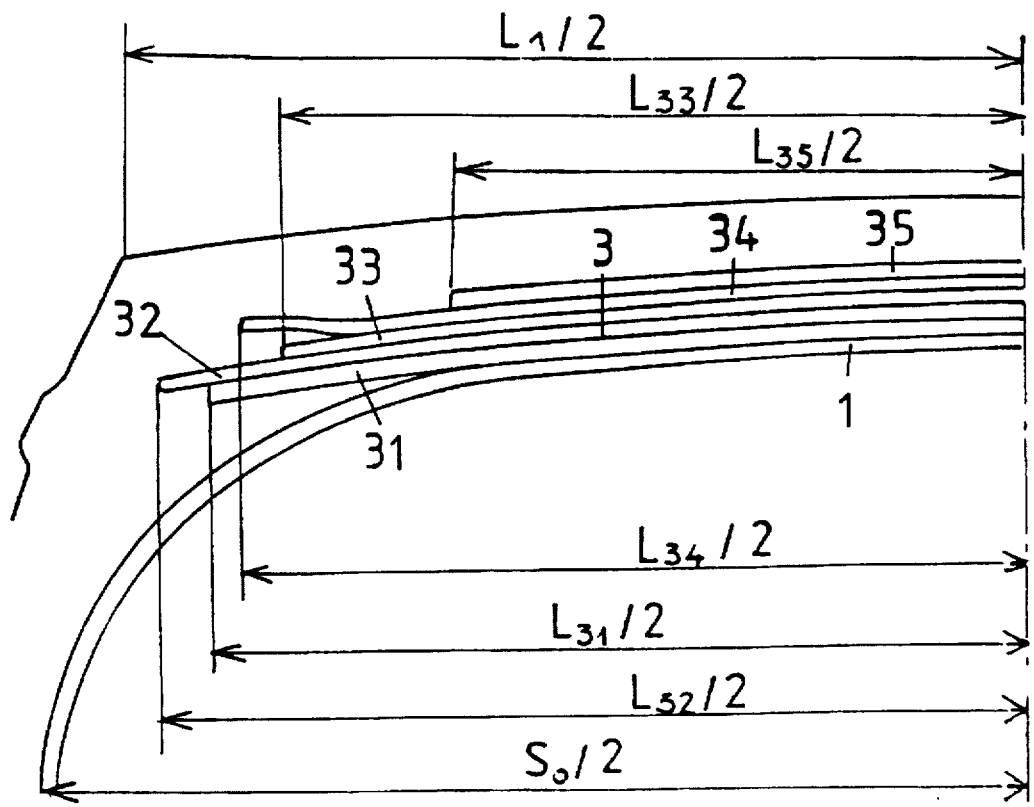
FIG. 1 shows a diagram of a meridian section through a crown reinforcement according to the invention.

The tire P, of dimension 495/45 R 22.5 X, has an H/S form ratio of 0.45, H being the height of the tire P on its mounting rim and S its maximum axial width. Said tire P comprises a radial carcass reinforcement 1 anchored in each bead to at least one bead wire, forming an upturn, and formed by a single ply of metal cables. This carcass reinforcement 1 is hooped by a crown reinforcement 3, formed radially from the inside to the outside

- by a first ply 31 of inextensible metal cables oriented relative to the circumferential direction by an angle δ of 65°, the object of said ply being to absorb a major part of the axial compression forces to which the radial carcass reinforcement 1 may be subjected,
- radially above and covering the preceding so-called triangulation ply, by a first working ply 32 formed of inextensible metal cables oriented by an angle α, equal to 22° in the case illustrated,
- surmounting the first working ply 32, by an additional ply 33 formed of inextensible metallic elements of a circumferential length substantially equal to ⅙ of the circumferential length of the ply 33, said elements being oriented at 0°,
- then by a second working ply 34 formed of metal cables identical to those of the first working ply 32, and forming an angle β, opposed to the angle α and, in the case illustrated, equal to said angle α of 22° (but possibly being different from said angle α), with the circumferential direction,
- and finally by a final ply of so-called elastic cables oriented relative to the circumferential direction by an angle γ of the same direction as the angle β and equal to said angle β (but possibly being different from said angle), this last ply being a protective ply.

The axial width $L_{32}$ of the first working ply 32 is equal to 0.87 times the maximum axial width $S_0$ of the centre line of the carcass reinforcement 1, namely 416 mm, which, for a tire of conventional shape, is substantially less than the width $L_1$ of the tread, which is equal in the case in question to 430 mm. The axial width $L_{34}$ of the second working ply 34 is equal to 0.8 times the axial width $S_0$, namely 400 mm. The triangulation ply 31 has an axial width $L_{31}$ equal to the arithmetical mean of the widths of the two working plies 32 and 34, and in this case to 408 mm. As for the axial width $L_{33}$ of the additional ply 33, which is at least equal to 0.7 $S_0$, it is equal to 350 mm, which represents 0.73 $S_0$. In fact, the width $L_{33}$ of the additional ply 33 is less than the width $L_{34}$ of the least wide working ply, without, however, being too low so as to contribute effectively to the reduction of the operating temperatures of the tire close to the ends of the working crown plies, which are the regions most adversely affected by the heating and the separation between plies. The final crown ply 35, referred to as a protective ply, has a width $L_{35}$ which is less than the previous ones, namely 325 mm.

The elastic modulus of traction of the working ply 32 or of the working ply 34, in this case identical, since it is formed by the same hooped 27.23 metal cables which are inextensible and continuous over the entire width of the ply, said cables being arranged with the same pitch, that is to say with the same space between cables, is equal to 5300 daN/mm² at 0.4% relative elongation. The modulus, of the same name and measured under the same conditions, of the so-called triangulation ply 31, formed of hooped 9.23 metal cables, is equal to 6925 daN/mm². As for the additional ply 33, it is formed of hooped 27.23 metal cables, cut so as to have sections of cables the circumferential length of which is equal to ⅙ of the circumferential length of the ply, which imparts thereto a tangent modulus of elasticity upon traction for a relative elongation of 0.4% of 3310 daN/mm².

Figure 2:
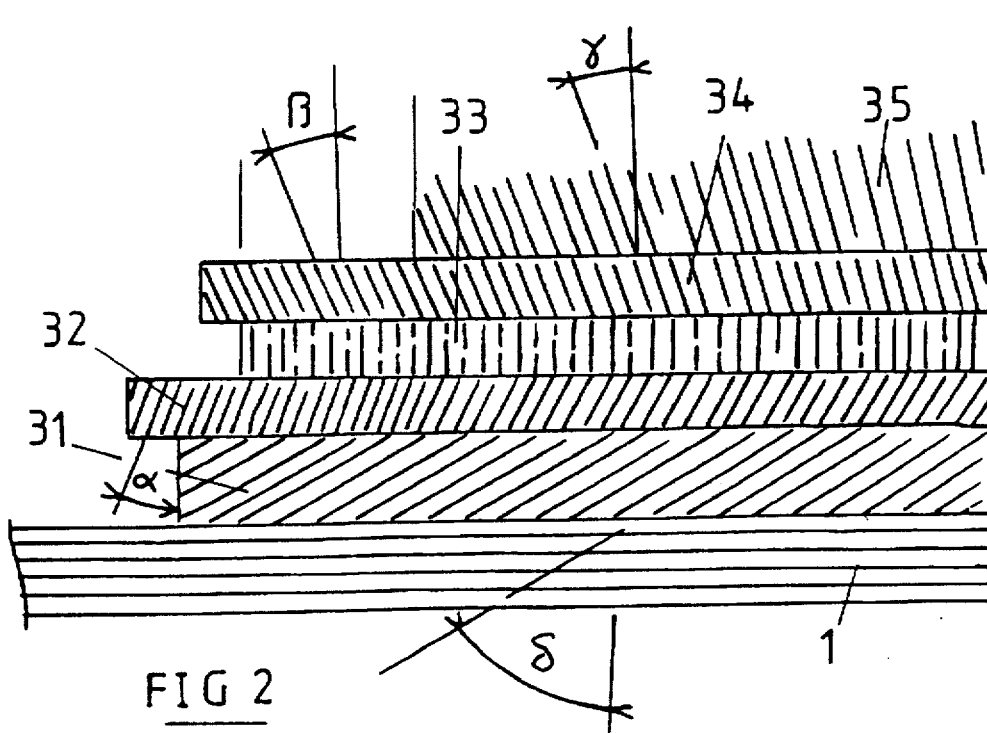
FIG. 2 shows the crown reinforcement of FIG. 1, in plan view and in a partial section.

The additional ply 33 may also be formed of so-called elastic bimodular cables, that is to say, cables having relative elongations at rupture greater than 2.5% and tensile force-relative elongation curves having two parts having substantially different gradients, such as the curve 17 shown in FIG. 2 of Patent FR 1,188,486. Since reduced elasticity of the ply 33 is only useful during the shaping of the tire in the vulcanisation mould, a cable having a low modulus at the start for 0.4% relative elongation and a modulus for instance greater than 14000 daN/mm² makes it possible readily to obtain a ply of cables oriented substantially at 0° having, above 0.4% relative elongation, a modulus of 5200 daN/mm².

The tire described above makes it possible to obtain satisfactory endurance, firstly from the point of view of separations between working crown plies despite their widths, owing to the combined action of the ply of circumferential cables and of the ply of steeply inclined cables on the operating temperature in the vicinity of the ends of the shortest working ply, and on the shear stresses between the two working plies, and secondly from the point of view of fatigue strength of the portion of carcass located beneath the crown reinforcement, the combined action of the ply of circumferential cables and of the ply of steeply inclined cables avoiding the compression of said carcass reinforcement cables.

I claim:

1. A tire having a carcass reinforcement (1) and a crown reinforcement (3) comprising at least two working crown plies (32, 34) of inextensible cables, crossed from one ply (32) to the next (34), forming angles (α, β) of between 10° and 45° with the circumferential direction, said plies having widths $L_{32}$, $L_{34}$ at least equal to 80% of the maximum axial width $S_0$ of the carcass reinforcement (1), the tire characterised in that firstly an axially continuous ply (31) formed of inextensible metal cables forming with the circumferential direction an angle δ of at least 60° and the axial width $L_{31}$ of which is at least equal to the axial width $L_{32}$,$L_+$of the shortest working crown ply (32, 34) is arranged between the carcass reinforcement (1) and the working ply (32) radially closest to the axis of rotation, and secondly an additional ply (33) formed of metallic elements oriented substantially parallel to the circumferential direction, the axial width $L_{33}$ of said additional ply being at least equal to 0.7 $S_0$, and its elasticity modulus upon traction being at most equal to that of the most extensible working ply, is arranged between the two working crown plies (32, 34).

2. A tire according to claim 1, characterised in that the modulus of the additional ply is low for a relative elongation of between 0% and 0.4%, and at most equal to the greatest elasticity modulus upon traction of the most extensible working ply, for relative elongations greater than 0.4%.

3. A tire according to claim 2, characterised in that the additional ply is formed of so-called elastic cables, having a curve of tensile stress as a function of the relative elongations which has shallow gradients for the slight elongations of between 0 and 0.4% and a steep and substantially constant gradient for the greater elongations.

4. A tire according to claim 2, characterised in that the additional ply is formed of cables oriented circumferentially and cut so as to form sections of a length very much less than the circumference of the ply, the cuts between sections being axially offset relative to each other.

\* \* \* \* \*